United States Patent
Singla

(10) Patent No.: US 11,544,123 B1
(45) Date of Patent: Jan. 3, 2023

(54) SYSTEMS AND METHODS FOR DETECTING PARTITIONED AND AGGREGATED NOVEL NETWORK, USER, DEVICE AND APPLICATION BEHAVIORS

(71) Applicant: Anurag Singla, Cupertino, CA (US)

(72) Inventor: Anurag Singla, Cupertino, CA (US)

(73) Assignee: Anurag Singla, Cupertino, CA (US)

( * ) Notice: Subject to any disclaimer, the term of this patent is extended or adjusted under 35 U.S.C. 154(b) by 92 days.

(21) Appl. No.: 17/360,317

(22) Filed: Jun. 28, 2021

(51) Int. Cl.
  *G06F 9/54* (2006.01)
  *G06F 11/34* (2006.01)
(52) U.S. Cl.
  CPC .......... *G06F 9/542* (2013.01); *G06F 11/3409* (2013.01)
(58) Field of Classification Search
  CPC .............................. G06F 9/542; G06F 11/3409
  See application file for complete search history.

(56) References Cited

U.S. PATENT DOCUMENTS

| | | | |
|---|---|---|---|
| 2018/0165139 A1* | 6/2018 | Kolodzieski | G06F 8/60 |
| 2019/0026491 A1* | 1/2019 | Telford | G06F 21/6227 |
| 2020/0285737 A1* | 9/2020 | Kraus | G06F 21/552 |
| 2020/0404010 A1* | 12/2020 | Costante | H04L 63/0236 |
| 2021/0053489 A1* | 2/2021 | Golov | G06T 7/50 |
| 2021/0073290 A1* | 3/2021 | Hunter | G06F 8/65 |
| 2021/0404818 A1* | 12/2021 | Xu | G01C 21/3461 |

* cited by examiner

*Primary Examiner* — Tuan C Dao

(57) ABSTRACT

According to an example, an autonomous novel behavior detection apparatus may receive network, user, application and device events; partition the network, user, device and application behavior events to plurality of partitions; extract features from the events based on fieldnames, type of data and type of values stored in the corresponding fields in an unsupervised manner; transform the data in the events from all data types to numerical values; normalize the data in the events; utilize training neural networks to learn the network, user, device and application behavior from the events; evaluate network, user, device and application events for novel behavior events using evaluation models; learn the novel behaviors using a plurality of neural networks, filter out novel behavior events that are similar to learned novel behaviors, identify novel behaviors and summarize novel behaviors into meaningful aggregation of novel behaviors.

16 Claims, 9 Drawing Sheets

700

RECEIVE A NETWORK, USER, DEVICE OR APPLICATION EVENT FROM A PARTITION 302
702

EVALUATE THE EVENT IN THE EVALUATION MODULE 142 BY ONE OR MORE MODELS CORRESPONDING TO THE PARTITION THAT THIS EVENT MAPS TO, AND DETERMINE IF IT IS A NOVEL BEHAVIOR EVENT
704

IN RESPONSE TO A DETERMINATION THAT THE EVENT IS A NOVEL BEHAVIOR EVENT, EVALUATE THE EVENT WITH ONE OR MORE MODELS FROM ONE OR MORE DIFFERENT PARTITIONS, AND DETERMINE IF IT IS A NOVEL BEHAVIOR EVENT IN THOSE PARTITIONS ALSO.
706

IN RESPONSE TO A DETERMINATION THAT EVENT IS A NOVEL EVENT IN OTHER PARTITIONS ALSO, CLASSIFY THE EVENT AS A NOVEL BEHAVIOR EVENT
708

IN RESPONSE TO A DETERMINATION THAT EVENT IS NOT A NOVEL EVENT IN ONE OR MORE MODELS FROM DIFFERENT PARTITIONS, CLASSIFY THE EVENT AS A NORMAL BEHAVIOR USING A PROBABILITY DISTRIBUTION AND A STATIC OR DYNAMIC THRESHOLD
710

Example Firewall Event:
1623882989,5580,10.11.12.13,142.250.191.46,17,5507,46272,10,755065,1000,1042329018

The event provides following information:

| Information | Description |
|---|---|
| 1623882989 | Time of the event in seconds since January 1, 1970 (midnight UTC/GMT) |
| 5580 | Duration of activity in milli seconds |
| 10.11.12.13 | IP address of the device initiating the activity, also known as source device |
| 142.250.191.46 | IP address of the target device in the activity, also known as target device |
| 17 | Protocol number used by the network connection in the activity |
| 5507 | Network port used on the source device |
| 46272 | Network port used on the target device |
| 10 | Number of network packets sent by source device |
| 755065 | Total number of bytes sent by source device |
| 1000 | Total number of network packets received by source device |
| 1042329018 | Total number of bytes received by source device |

FIG. 2

SYSTEMS AND METHODS FOR DETECTING PARTITIONED AND AGGREGATED NOVEL NETWORK, USER, DEVICE AND APPLICATION BEHAVIORS

BACKGROUND

An organization or an entity typically has a large number of network devices (including but not limited to computers, printers, firewalls, web proxies, Intrusion Detection Systems, Intrusion Prevention Systems, Data Leakage Prevention Systems, Badge Systems) and software applications. There are users (including but not limited to employees, contractors, partners, vendors, autonomous systems, people on the internet) that interact with these devices and applications. For most of these interactions there are logs and records generated by devices and applications. These logs typically contain information about the entities and resources involved in the event, type of actions taken and additional details about the interaction. These events or logs can be utilized to train a plurality of behavior learning models that can evaluate new events or logs for novelty. Detecting these novel behaviors can help organizations in determining new or unexpected behaviors that may be potentially malicious.

BRIEF DESCRIPTION OF DRAWINGS

Features of the present disclosure are illustrated by way of example and not limited in the following figure(s), in which like numerals indicate like elements, in which:

FIG. 2 illustrates a network event from a firewall device, according to an example of the present disclosure;

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Organizations typically keep logs of network, user, device and application activities for forensic analysis. These logs can be utilized by systems to detect potentially malicious activities.

According to examples, an autonomous novel behavior detection apparatus and a method for detecting novel network, user, device or application behavior are disclosed herein. For the apparatus and method disclosed herein, the network, user, device and application event logs may be generated by any of the systems involved in the interaction. These event logs typically contain information about the entities and resources involved in the event, type of actions taken and additional details about the interaction. The apparatus and method disclosed herein may learn the existing network, user, device and application behaviors from these logs, and evaluate subsequent event logs against learned behaviors and identify novel behaviors. These identified novel behaviors are learned again to be able to identify new behaviors that are similar to behaviors identified as novel in the past. The novel behaviors that are not identical or similar to already identified novel behaviors are surfaced as novel behaviors. These novel behaviors are clustered together in a multi-dimensional space to combine them into summarized novel behaviors that a user can review. These novel behaviors may indicate a potentially malicious activity or match an expected shift in behavior.

Figure 1:
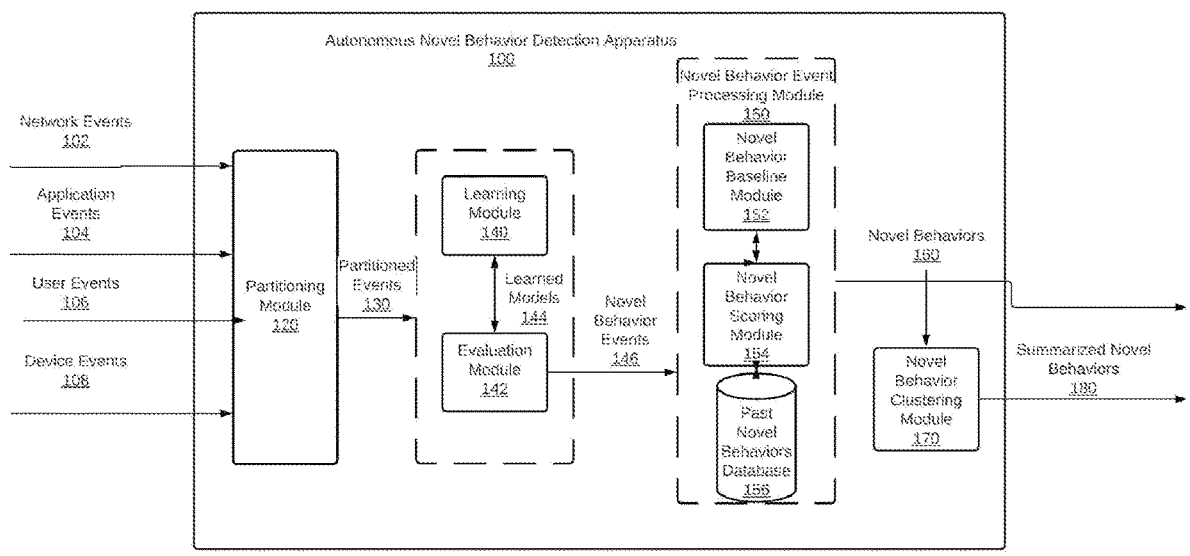
FIG. 1 illustrates an architecture of a novel behavior detection apparatus, according to an example of the present disclosure.

FIG. 1 illustrates an architecture of an Autonomous Novel Behavior Detection Apparatus 100 (hereinafter also referred to as "apparatus 100"), according to an example of the present disclosure. Referring to FIG. 1, the apparatus 100 is depicted as including a Partition module 120 to partition the incoming events (including Network Events 102, Application Events 104, User Events 106, Device Events 108) to be processed by multiple models. Partitioning module contains multiple handlers that split the incoming events into a plurality of partitions. The partitioning is performed based on the information in the event (E.g. user information, device information, application etc.) Partition module 120 can adjust the number of partitions by splitting an existing partition into multiple partitions if a partition is receiving a large percentage of events or merging a plurality of partitions into a single partition if those partitions received a very small subset of events. The partition module also normalizes the values of various information fields in the event by firstly converting non-numeric values to numeric values utilizing transformation functions (including hashing) and adjusting the numeric values so that the values in different information fields are comparable in size.

Learning Module 140 receives the partitioned events 130 and utilizes the information in these events to augment the learned behavior by including the newly received information. Learning Module 140 contains a plurality of neural network learning models per partition split created by Partition Module 120. The models in Learning Module 140 use a combination of neural networks (including Auto Encoders, Sparse Auto Encoders, Denoising Auto Encoders, Functional Models, Variational AutoEncoders, Sequential neural networks). Multiple models are utilized to determine the deviation of new events from the learned behavior. Learning Module 140 periodically updates Evaluation Module 142 by providing updated instances of learned models. Evaluation Module 142 uses the models provided by Learning Module 140 to evaluate Partitioned Events 130. Learning Module 140 provides plurality of Learned Models 144 at a varying time interval to Evaluation Module 142, so that an adversary cannot take advantage of the predictable staleness of models in Evaluation Module 142. Staleness could allow an adversary to perform a decoy attack, flooding the system with anomalous events before conducting a real attack.

Learning Module 140 also includes certain models that skip varying percentages of events. The percentages of events to be skipped as well as the events that need to be skipped are determined randomly using various probability distributions (including normal, Gaussian etc.) by dropping random samples of events from a subset of the models in the Learning Module 140, the adversaries are prevented from intentionally training the system by purposely performing certain activity in a slow and less harmful way before conducting real attack.

Evaluation Module 142 utilizes neural network models to detect if an evaluated Partitioned Event 130 deviates from the learned behavior of the events by the evaluating model. If the behavior deviates more than a threshold then the event is marked as a Novel Behavior Event and is sent to Novel Behavior Event Processing Module 150. The threshold for determining novel behavior events can be fixed or flexible. In case of flexible threshold, it is determined automatically based on the deviations of prior events and is adjusted dynamically during the course of processing events to allow for only a limited number of Partitioned Events 130 to become Novel Behavior Events 146.

Inside Novel Behavior Event Processing Module 150, Novel Behavior Events 146 are first processed by Novel Behavior Baseline Module 152 that evaluates Novel Behavior Events 146 for deviation from past Novel Behavior Events 146 utilizing neural networks (including Auto Encoders, Sparse Auto Encoders, Denoising Auto Encoders, Functional Models, Variational AutoEncoders, Sequential neural networks). After evaluating new Novel Behavior Events 146, Novel Behavior Baseline Module 152 trains on the same Novel Behavior Events 146 so that in future these match the baseline and are no longer Novel Behavior Events 146 of interest. These Novel Behavior Events 146 of interest are evaluated against Past Novel Behavior Events Database 156, and pre-existing Novel Behavior Events are filtered out. These events are scored by Novel Behavior Scoring Module 154, and the events with a score above a threshold (fixed or flexible, determined dynamically) are output as Novel Behaviors 160. Novel Behaviors 160 are one of the outputs of the Autonomous Novel Behavior Detection Apparatus 100.

Novel Behaviors 160 are further processed by Novel Behavior Clustering Module 170. Novel Behavior Clustering Module 170 clusters the novel behaviors 160 over a dynamic period of time across multiple feature dimensions. It projects the novel behavior event onto a multi-dimensional space where each feature of the Novel Behaviors 160 form a dimension. It identifies the dimension that provides the best summarization of the Novel Behaviors 160 on the basis of proximity, identicality and similarity of values in the fields. It clusters Novel Behaviors 160 further by picking additional dimensions incrementally. The Novel Behaviors 160 that are not close enough in the multi-dimensional, as described above, are not clustered together and are output as independent novel behaviors. The output of Novel Behavior Clustering Module 170 are the summarized Novel Behaviors that can be used by a user to get understanding of novel behaviors in their organization, investigate them further for detection and prevention of malicious attacks.

FIG. 2 provides an example of a firewall event. According to the example, a firewall event may provide information regarding interaction of two devices including the time when the activity took place, duration of the activity, details of the devices involved and details of data transferred. By processing, plurality of such events, Autonomous Novel Behavior Detection Apparatus 100 learns the current behavior of interactions utilizing neural networks (including Auto Encoders, Sparse Auto Encoders, Denoising Auto Encoders, Functional Models, Variational AutoEncoders and Sequential neural networks). Multiple models are utilized to determine the deviation of new events from the learned behavior. A plurality of deviation metrics is utilized to determine if the new event depicts novel behavior. As an example, one of the model may calculate mean and standard deviation of the deviation of each event and declare an event that has deviation more than (mean +6* standard deviation) as a novel behavior.

According to an example, there may be a large amount of data transferred to a target device that is neither identical or similar to the target devices that have been observed before. Furthermore, other information contained in the event may deviate from the type of information seen in such events before (E.g. number of source and target packets, source and target ports involved in similar events). Autonomous Novel Behavior Detection Apparatus 100 may declare these events novel. These events may potentially be indicating a data breach. By detecting these novel behaviors, as and when they occur, the system may prevent future breaches and attacks.

Figure 3:
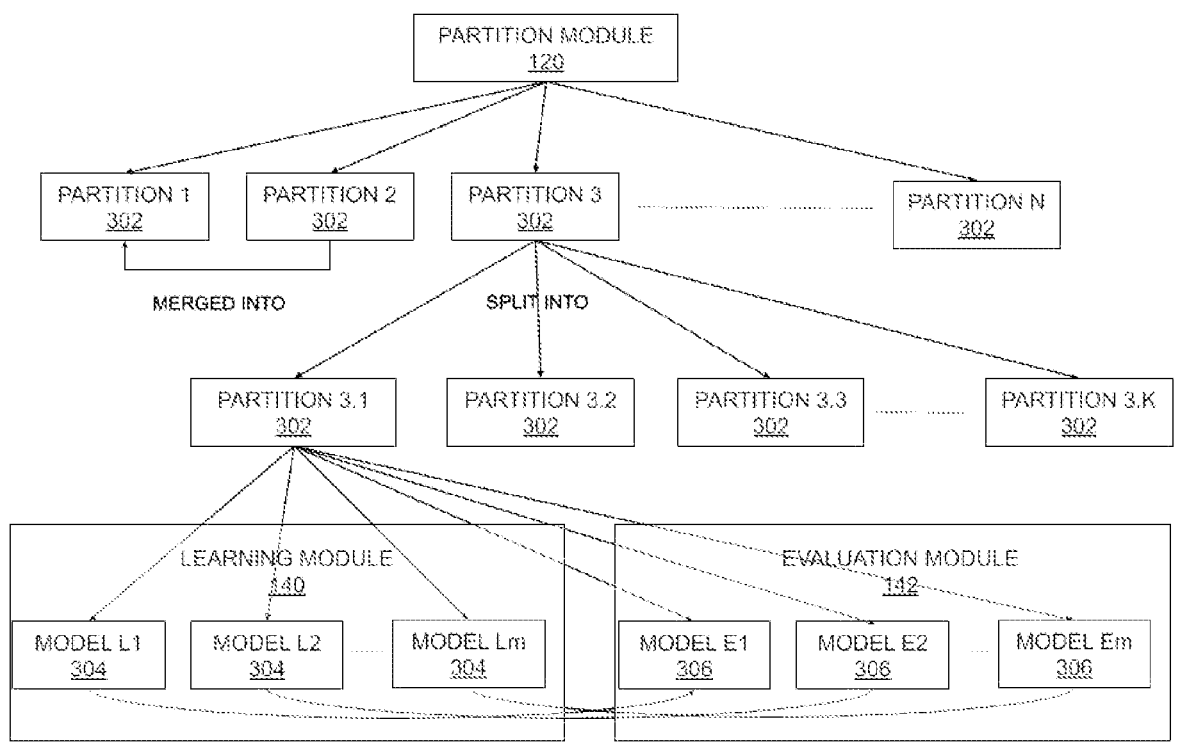
FIG. 3 illustrates detailed architecture of a partition module, learning module and an evaluation module in a novel behavior detection apparatus, according to an example of the present disclosure.

FIG. 3 illustrates how a partition module consists of multiple partitions 302 that can be merged into an existing partition or split into multiple partitions. Each of these partitions map to multiple neural network models 304 and 306 in Learning Module 140 and Evaluation Module 142.

According to an example, a partition (PARTITION 2) has gotten merged into another partition (PARTITION 1) due to a low rate of events matching PARTITION 2. The events mapping to PARTITION 2 and now mapped to PARTITION 1. As another example, a partition (PARTITION 3) has been split into K new partitions (PARTITION 3.1, 3.2, 3.3, . . . 3.K). The events that originally mapped to PARTITION 3 are now further mapped to the split partitions (PARTITION 3.1, 3.2, 3.3, . . . 3.K). According to the example, PARTITION 302 and PARTITION 303 do not directly process any events any more as their events are mapped to PARTITION 1 and (PARTITION 3.1, 3.2, 3.3, . . . 3.K) respectively.

According to an example, there are multiple Neural Network Models 304 processing events of each partition. According to an example, PARTITION 3.1 302 events are processed by a plurality of models (MODEL L1, L2, Lm) 304 in the Learning Module 140, and plurality of models (MODEL E1, E2, Em) in the Evaluation Module 142. For each model 304 in the Learning Module 140, there is a corresponding model 306 in the Evaluation Module 142 and vice versa.

Figure 4:
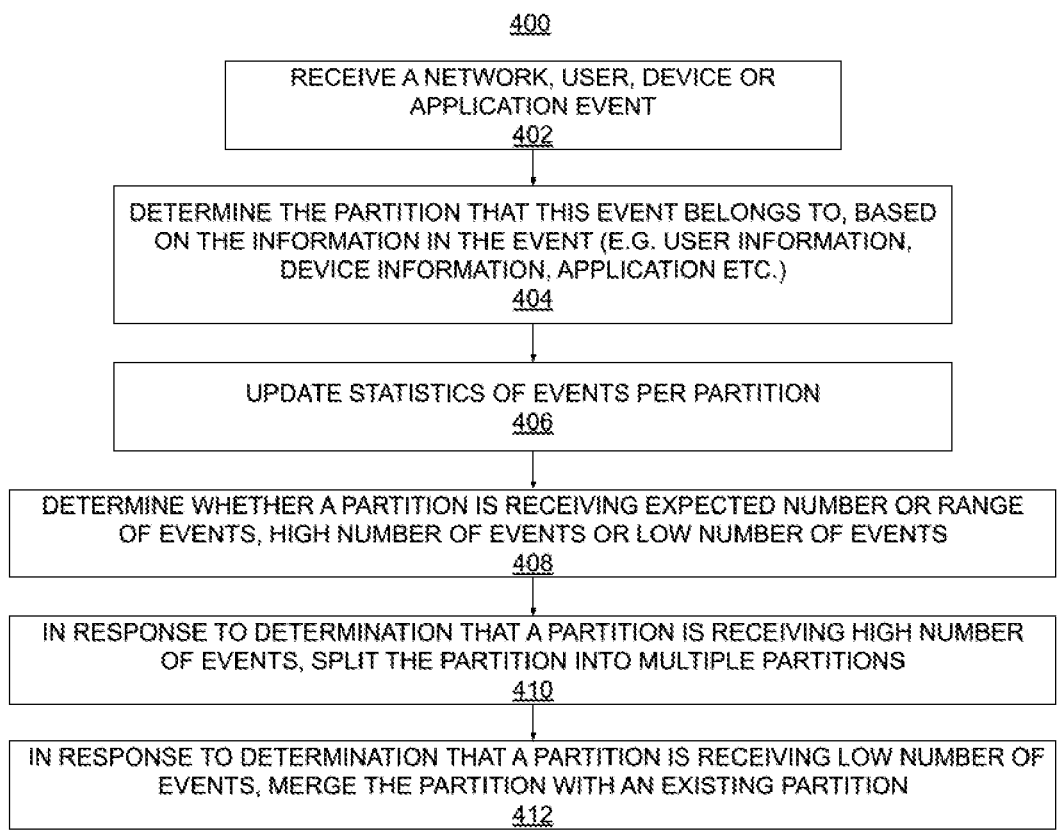
FIG. 4 illustrates a method for adjusting the number of partitions in a partition module of a novel behavior detection apparatus, according to an example of the present disclosure.

FIG. 4 illustrates flowchart of method 400 for determining the number of partitions by the Partitioning Module 120 with reference to FIG. 1, corresponding to the example of the Autonomous Novel Behavior Detection Apparatus 100 whose construction is described in detail above. The methods 400 may be implemented on the Autonomous Novel Behavior Detection Apparatus apparatus 100 with reference to FIG. 1 by way of example and not limitation. The methods 400 may be practiced in other apparatus.

Referring to FIG. 4, for method 400, at block 402, the method may include receiving a network, user, device or application event. At block 404, the method may include determining the partition that the event belongs to, based on the information in the event (E.g. User information, device information, application information etc.) According to an example, events from a particular IP Address subnets may be mapped to one partition. According to another example, events corresponding to a subset of users may be mapped to one partition. For example, referring to FIG. 3, a certain event may be mapped to a PARTITION 302, based on the user information present in the received event.

At block 406, the method may include determining various event statistics for each partition. For example, referring to FIG. 1, the Partitioning Module 120 may compute statistics including minimum number of events per minute (or another duration interval), maximum number of events per duration interval, mean and standard deviation of events per duration interval, rate of increase or decrease of the events etc.

At block 408, the method may include determining whether a partition is receiving expected number or range of events, or instead if it is receiving high or low number of events. For example, referring to FIG. 1, the Partitioning Module 120 may maintain an expected range of events per partition based on number of total partitions in the system, rate of network, application, user and device events received by the system, respective load of each partition etc.

In response to a determination that a partition may be receiving a high number of events based on analysis of event and partition statistics, at block 410, the method may include merging the partition into multiple partitions. According to an example, referring to FIG. 3, in response to a determination that a partition PARTITION 3 is receiving a high number of events, the partition PARTITION 3 may be split into K split partitions (PARTITION 3.1, 3.2, 3.3, . . . 3.K). With reference to FIG. 1, the Partitioning Module 120, may not send any event mapping to PARTITION 3 but partition it further into split partitions (PARTITION 3.1, 3.2, 3.3, . . . 3.K), and send the event directly to the split partition the events maps to.

In response to a determination that a partition may be receiving a low number of events based on analysis of event and partition statistics, at block 412, the method may include merging the partition with an existing partition. According to an example, referring to FIG. 3, in response to a determination that a partition PARTITION 2 is receiving a low number of events and is to be merged with an existing partition, an existing partition PARTITION 1 may be identified and PARTITION 2 may be merged with PARTITION 1. In case a partition is a split partition already (E.g. PARTITION 3.1) and is receiving a low number of events, it is merged with one of the sibling partitions (E.g. PARTITION 3.2, 3.3, . . . 3.K). If after merging, only one split partition is left, it is removed in favor of the parent partition PARTITION 3, from which the split partition was created.

According to an example, method 400 may include a minimum and maximum number of desired partitions in determining whether to split a partition or merge a partition. In case a split may increase the number of partitions beyond the maximum number of desired partitions, it may lead to merging of one or more existing partitions to stay within the desired limits of number of partitions.

Figure 5:
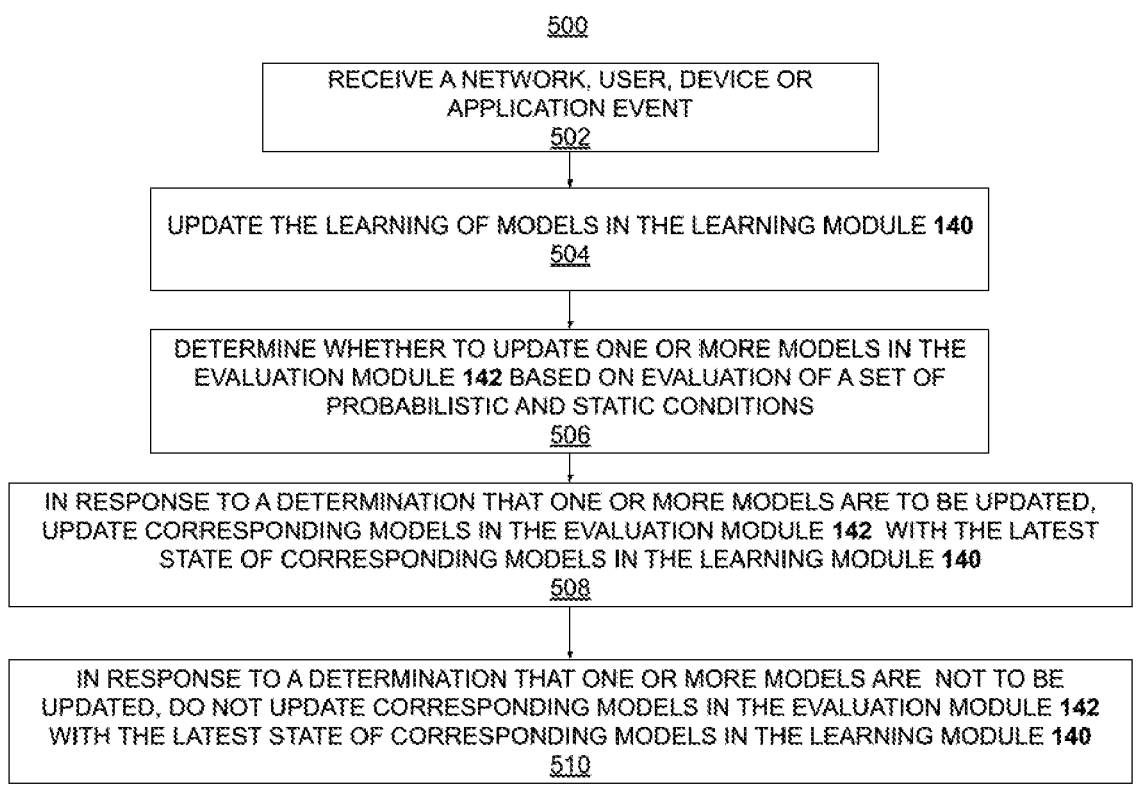
FIG. 5 illustrates a method for determining whether a learning module to update one or mode models in the evaluation module of a novel behavior detection apparatus, according to an example of the present disclosure.
Figure 6:
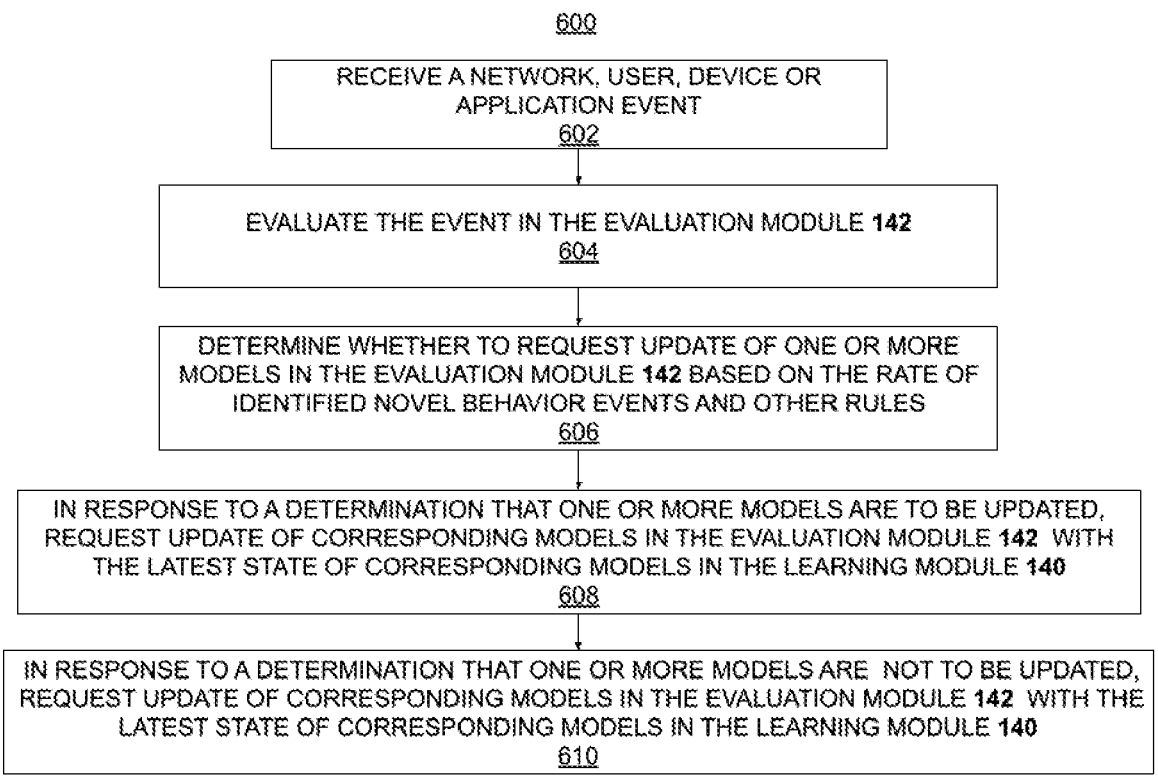
FIG. 6 illustrates a method for determining whether an evaluation module to request update of one or more of its models from the learning module of a novel behavior detection apparatus, according to an example of the present disclosure.

FIGS. 5 and 6 respectively illustrate flowcharts of methods 500 and 600 for determining update of models in Evaluation Module 142 from the latest state of corresponding models in Learning Module 140, corresponding to the example of the Autonomous Novel Behavior Detection Apparatus 100 whose construction is described in detail above. The methods 500 and 600 may be implemented on the Autonomous Novel Behavior Detection Apparatus apparatus 100 with reference to FIG. 1 by way of example and not limitation. The methods 500 and 600 may be practiced in other apparatus.

Referring to FIG. 5, for the method 500, at block 502, the method may include receiving a network, user, device or application event. At block 504, the method may include updating the state of models in the Learning Module 140 by learning the behavior and information in the received event. At block 506, the method may include determining whether to update one or more models in the Evaluation Module 142 based on evaluation of a set of probabilistic and static conditions. For example, referring to FIG. 3, Learning Module 140 may determine that models MODEL E1 306 and MODEL E2 306 be updated in the Evaluation Module 142 with the latest state of corresponding models MODEL L1 304 and MODEL L2 304 in the Learning Module 140, as a certain duration threshold has passed since the last update. According to an example, this duration threshold may be calculated using a probabilistic distribution (normal, gaussian etc.)

According to an example, the determination of updating certain models in the Evaluation Module 142 with the latest state in the Learning Module 140 may be based on the rate of events received by certain models. For example, referring to FIG. 3, a certain partition 302 may be receiving a high rate of events, and the models corresponding to those events may be updated in the Evaluation Module 142 at a higher frequency. In certain cases, a higher rate may also lead to slower updates to be unpredictable to the adversary as well as to keep up with the high load in the partition.

According to an example, the determination of updating certain models in the Evaluation Module 142 with the latest state in the Learning Module 140 may be based on the rate of events received by certain models. For example, referring to FIG. 3, a certain partition 302 may be receiving a low rate of events, and the models corresponding to that partition may be updated in the Evaluation Module 142 at a lower frequency. In certain cases, a lower rate may also lead to faster updates to be unpredictable to the adversary.

According to an example, at block 506, referring to FIG. 1, Learning Module 140 may determine based on a random probability value using normal probability distribution function and comparing the value against a static or dynamic threshold, that the state of one or more models in Evaluation Module 142 to be updated from the latest state of corresponding learned models in Learning Module 140.

In response to a determination that one or more models in the Evaluation Module 142 be updated, at block 508, the method may include updating identified models in the Evaluation Module 142 with the latest state of corresponding models in the Learning Module 140. For example, referring to FIG. 3, in response to a determination that models MODEL E1 306 and MODEL E2 306 be updated in the Evaluation Module 142, the Learning Module 140 may update MODEL E1 306 and MODEL E2 306 in the Evaluation Module 142 with the latest state of corresponding models MODEL L1 304 and MODEL L2 304 in the Learning Module 140.

In response to a determination that one or more models in the Evaluation Module 142 be not updated, at block 510, the method may include not updating the models in the Evaluation Module 142 with the latest state of corresponding models in the Learning Module 140. For example, referring to FIG. 3, in response to a determination that none of the models be updated in the Evaluation Module 142, the Learning Module 140 may not update any model in the Evaluation Module 142 with the latest state of corresponding models in the Learning Module 140.

According to an example, method 500 may include determining the past rate of update of certain models in the Evaluation Module 142, and use that as a determination factor for updating the state of certain models in the Evaluation Module 142.

Referring to FIG. 6, for the method 600, at block 602, the method may include receiving a network, user, device or application event. At block 604, the method may include evaluating the event by the models in the Evaluation Module 142 for novel behavior, and maintaining statistics related to novel behavior detection by each model. For example, referring to FIG. 1, Evaluation Module 142 may update model statistics including rate of identified novel behaviors, ratio of number of identified novel behaviors to the number of events evaluated by each model, absolute number of novel behavior events identified by each model etc.

At block 606, the method may include determining whether to request update of one or more models in the Evaluation Module 142 based on the rate of identified novel behavior events and other rules. For example, referring to FIG. 3, Evaluation Module 142 may determine that models MODEL E1 306 and MODEL E2 306 be updated in the Evaluation Module 142 with the latest state of corresponding models MODEL L1 304 and MODEL L2 304 in the Learning Module 140, as rate of identified novel behaviors by these models is above a static or dynamic threshold. These models in Evaluation Module 142 may benefit by updating their state so that more recent events are included in the learning of the models. According to an example, the threshold for the rate of identified novel behaviors may be calculated using a probabilistic distribution (normal, gaussian etc.)

According to an example, at block 606, the determination of requesting updates to certain models in the Evaluation Module 142 with the latest state in the Learning Module 140 may be based on the ratio of number of identified novel behaviors to the number of events evaluated by each model. For example, referring to FIG. 3, Evaluation Module 142 may determine that MODEL E1 306 may be having a high ratio of number of identified novel behaviors to the number of events evaluated by this model, and request that Model E1 306 be updated in the Evaluation Module 142 with the latest state of corresponding models MODEL L1 304 in the Learning Module 140.

According to an example, at block 606, with reference to FIG. 3, the determination of requesting updates to certain models in the Evaluation Module 142 with the latest state in the Learning Module 140 may be based on comparison of the calculated statistics across all or a subset of models in the Evaluation Module 142. For example, referring to FIG. 3, Evaluation Module 142 may determine that MODEL E2 306 may not have high absolute ratio of number of identified novel behaviors to the number of events evaluated by this model, but the ratio is higher compared to other models, and request that Model E2 306 be updated in the Evaluation Module 142 with the latest state of corresponding models MODEL L2 304 in the Learning Module 140.

In response to a determination that one or more models in the Evaluation Module 142 be updated, at block 608, the method may include requesting an update of identified models in the Evaluation Module 142 with the latest state of corresponding models in the Learning Module 140. For example, referring to FIG. 3, in response to a determination that models MODEL E1 306 and MODEL E2 306 be updated in the Evaluation Module 142, the Evaluation Module 142 may request the Learning Module 140 to update MODEL E1 306 and MODEL E2 306 in the Evaluation Module 142 with the latest state of corresponding models MODEL L1 304 and MODEL L2 304 in the Learning Module 140.

In response to a determination that one or more models in the Evaluation Module 142 be not updated, at block 610, the method may include not requesting an update of identified models in the Evaluation Module 142 with the latest state of corresponding models in the Learning Module 140. For example, referring to FIG. 3, in response to a determination that none of the models be updated in the Evaluation Module 142, the Learning Module 140 may not request update to any model in the Evaluation Module 142 with the latest state of corresponding models in the Learning Module 140.

According to an example, method 600 may include determining the past rate of novel behavior detections of certain models in the Evaluation Module 142, and use that as a determination factor for updating the state of certain models in the Evaluation Module 142.

According to an example, method 600 may include determining the overall rate of novel behavior detections of all the models in the Evaluation Module 142, and use that as a determination factor for updating the state of some or all of the models in the Evaluation Module 142. For example, referring to FIG. 1, Evaluation Module 142 may determine that the rate of Novel Behavior Events 146 is high and may request Learning Module 140 to update the state of all the models in Evaluation Module 142 with the latest state of corresponding models in Learning Module 140.

Figure 7:
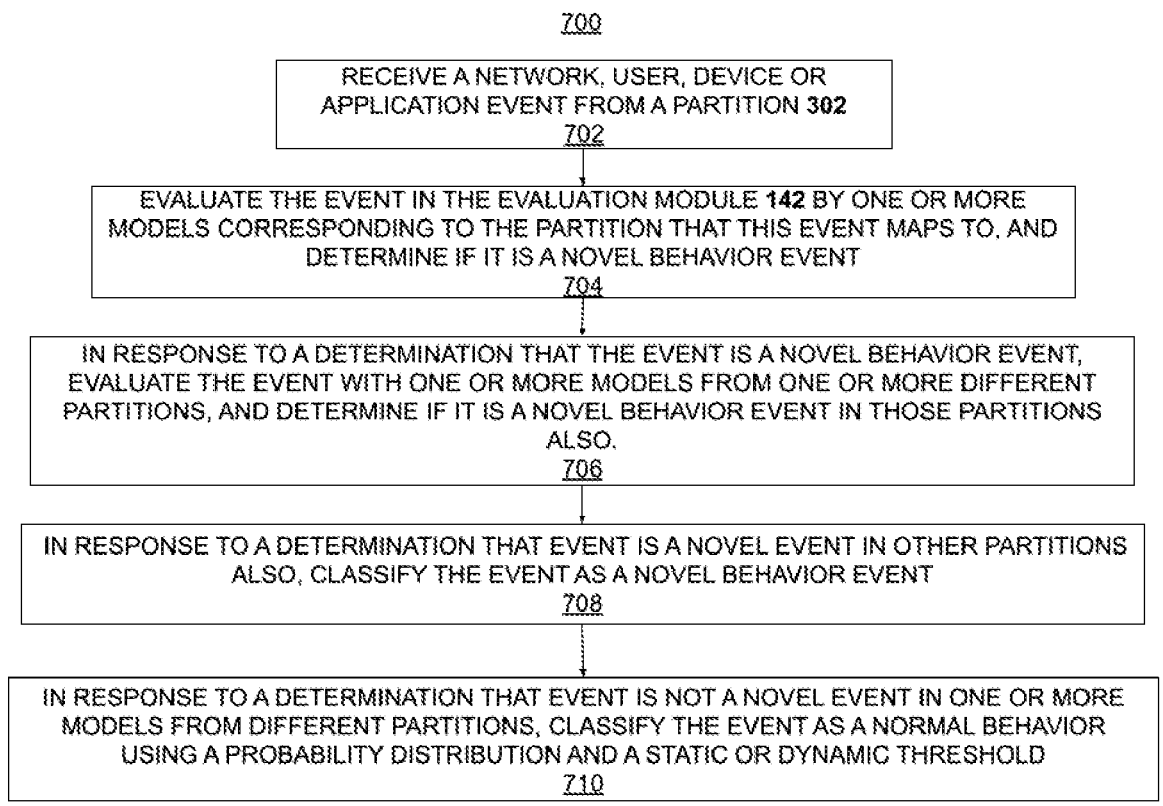
FIG. 7 illustrates a method for determining whether an event be classified as a novel behavior event based on evaluation of an event by models corresponding to the partition that the event maps to and the alternate partitions, in the evaluation module of a novel behavior detection apparatus, according to an example of the present disclosure.

FIG. 7 illustrates a method for determining whether an event be classified as a novel behavior event based on evaluation of an event by models corresponding to the partition that the event maps to and the alternate partitions, as output of the apparatus 100, with reference to FIG. 1, corresponding to the example of the Autonomous Novel Behavior Detection Apparatus 100 whose construction is described in detail above. The method 700 may be implemented on the Autonomous Novel Behavior Detection Apparatus apparatus 100 with reference to FIG. 1 by way of example and not limitation. The method 700 may be practiced in other apparatus.

Referring to FIG. 7, for method 700, at block 702, the method may include receiving one or more Novel Behavior Events 160 from a partition 302, with reference to FIG. 3. At block 704, the method may include evaluation of the event through one or more models in the Evaluation Module 142, corresponding to the partition that this event was mapped into when the stream of events received by apparatus 100 was divided into multiple partitions, and determining if the event is a novel behavior. For example, referring to FIG. 1 and FIG. 3, the event may get mapped to partition PARTITION 3.1 302, and evaluated by models MODEL E1 306, MODEL E2 306, . . . MODEL Em 306. One or more of the models MODEL E1 306, MODEL E2 306, . . . MODEL Em 306 may determine the event to be a novel behavior event.

In response to a determination that event is a novel behavior event, at block 706, the method may include evaluating the event further with models in the Evaluation Module 142, corresponding to the partitions that the event was not mapped into, and determining if the event would have been determine a novel behavior event by models corresponding to those partitions. For example, referring to FIG. 1 and FIG. 3, the event may be evaluated further by models corresponding to another partition PARTITION 1 302 that the event did not originally map into, and determining if the event would have been determined a novel behavior event by models corresponding to those partitions.

In response to a determination that the event is a novel behavior event in one or more other partitions also, at block 708, the method may include increasing the score of the novel behavior event by the Evaluation Module 142 based on the number and type of other models and partitions that determined this event to be a novel behavior event. For example, referring to FIG. 1, the score of the Novel Behavior Event 146 may be increased by Evaluation Module 142 from score 7.2 to score 7.7.

In response to a determination that the event is not a novel behavior event in one or more other partitions, at block 710, the method may include increasing classifying the event as a normal behavior event and no longer a novel behavior event by the Evaluation Module 142 based on a probability distribution and a statically defined or dynamically determined threshold. The method may use a probabilistic approach for suppressing the novel behavior event to allow for some percentage of the novel behavior events to be surfaced and prevent over-suppression of the novel behavior events. For example, referring to FIG. 1, the Novel Behavior Event 146 may be classified as normal behavior based on determination by models from other partitions as a normal event only 90% of the time. The percentage may vary over time.

Figure 8:
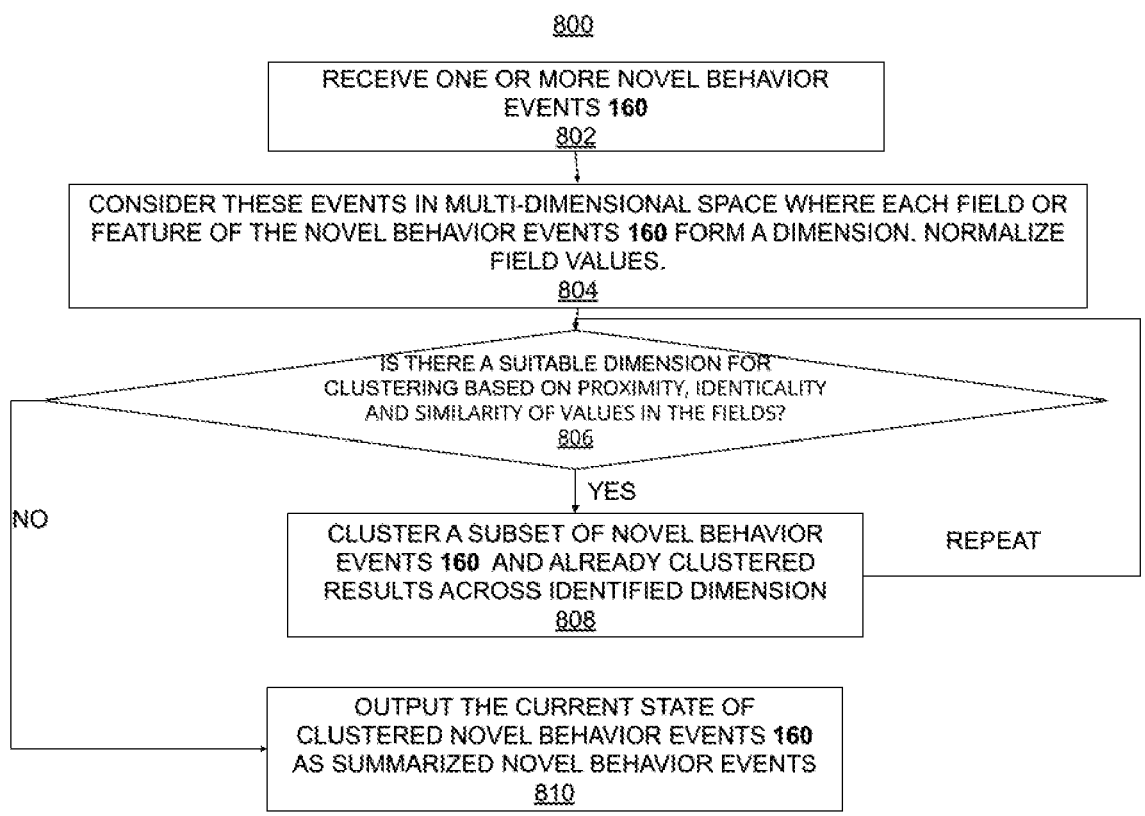
FIG. 8 illustrates a method for clustering multiple novel behaviors into one or more summarized novel behaviors, according to an example of the present disclosure.

FIG. 8 illustrates flowchart of method 800 for determining the Summarized Novel Behaviors 180 to be provided as output of the apparatus 100, with reference to FIG. 1, corresponding to the example of the Autonomous Novel Behavior Detection Apparatus 100 whose construction is described in detail above. The method 800 may be implemented on the Autonomous Novel Behavior Detection Apparatus apparatus 100 with reference to FIG. 1 by way of example and not limitation. The method 800 may be practiced in other apparatus.

Referring to FIG. 8, for method 800, at block 802, the method may include receiving one or more Novel Behavior Events 160. At block 804, the method may include considering the Novel Behavior Events 160 as multi-dimensional vectors in a multi-dimensional space where each field or feature of the Novel Behavior Events 160 forms a dimension of these multi-dimensional vectors. For example, referring to FIG. 1, Novel Behavior Clustering Module 170 may map certain Novel Behavior Events 160 with 20 fields each to a multi-dimensional vector of 20 dimensions. It may also normalize the values in these fields to make the dimensions comparable, so that large distances in one dimension do not result in favoring that dimension only for clustering.

According to an example, at block 804, Novel Behavior Clustering Module 170 may amplify the values in a certain field to increase distance between the values in the dimension corresponding to this field, giving more weight to an important dimension.

At block 806, the method may include determining whether there is a suitable dimension for clustering based on vector-distance proximity, identicality and similarity of values in the fields of Novel Behavior Events 160. For example, referring to FIG. 1, Novel Behavior Clustering Module 170 may identify Source IP address of the event, referring to FIG. 2, as a suitable dimension for clustering. As another example, referring to FIG. 1 and FIG. 2, Novel Behavior Clustering Module 170 may identify another field (E.g. Protocol, Destination Port etc.) of the event as a suitable dimension for clustering.

In response to a determination that a suitable dimension for clustering a subset of Novel Behavior Events 160 and a subset of already clustered results exists, at block 808, the method may include clustering subset of Novel Behavior Events 160 and a subset of already clustered results across identified dimension. For example, referring to FIG. 1, Novel Behavior Clustering Module 170 may use an identified dimension (E.g. Source IP address, referring to FIG. 2) to cluster the events and/or already clustered results. While clustering, certain fields may get aggregated to represent composite information.

In response to a determination that a suitable dimension for clustering a subset of Novel Behavior Events 160 and a subset of already clustered results does not exist, at block 810, the method may include outputting the currently clustered results as Summarized Novel Behaviors. For example, referring to FIG. 1, Novel Behavior Clustering Module 170 may output currently aggregated results as Summarized Novel Behaviors 180.

Figure 9:
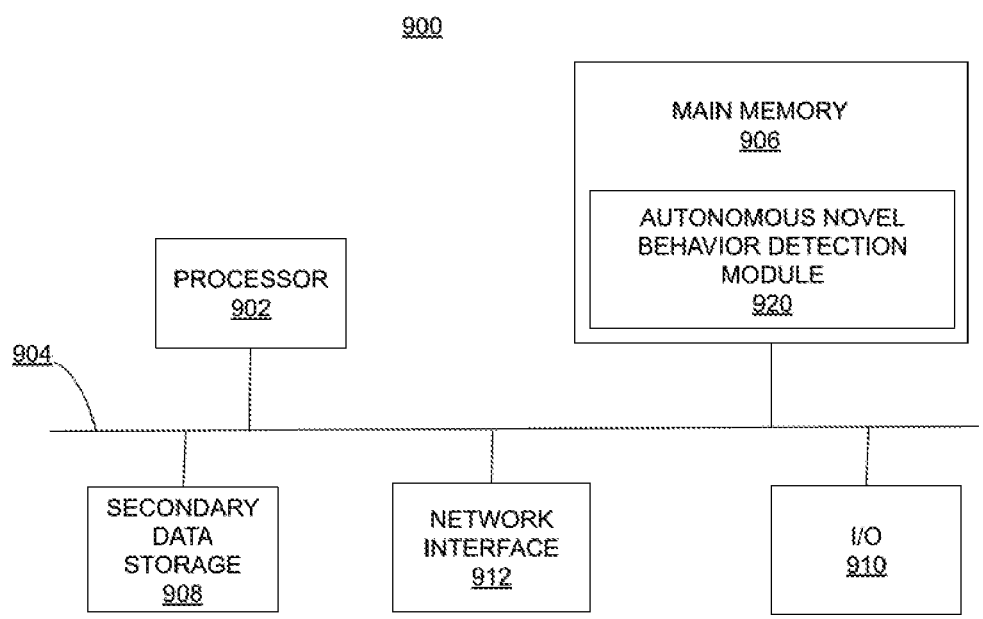
FIG. 9 illustrates a computer system, according to an example of the present disclosure.

FIG. 9 shows a computer system 900 that may be used with the examples described herein. The computer system 900 may represent a generic platform that includes components that may be in a server or another computer system. The computer system 900 may be used as a platform for the apparatus 100. The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 806, such as a random access memory (RAM), where the machine readable instructions and data for the processor 902 may reside during runtime, and a secondary data storage 908, which may be non-volatile and stores machine readable instructions and data. Memory and data storage are examples of computer readable mediums. The main memory 906 may include an autonomous novel behavior detection module 920 including machine readable instructions residing in the main memory 906 during runtime and executed by the processor 902. The autonomous novel behavior detection module 920 may include the modules of the apparatus 100 shown in FIG. 1.

The computer system 900 may include an I/O device 910, such as a keyboard, a mouse, a display, etc. The computer system may include a network interface 912 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

The invention claimed is:

1. A non-transitory computer readable medium having stored there on machine readable instructions to provide autonomous novel behavior determination from network, user, device and application events, the machine readable instructions, when executed, cause at least one processor to: receive network, user, application and device events; extract features from the events based on fieldnames, type of data and type of values stored in the corresponding fields in an unsupervised manner; divide the network, user, device and application behavior events to plurality of partitions utilizing one-way deterministic hashing functions on subset of user, device, application and network information in the events, transform the data in the events from all data types to numerical values; normalize the numerical values in the events to comparable ranges; use training neural networks to learn the network, user, device and application behavior from the events; evaluate network, user, device and application events for novel behavior events using evaluation neural network models that are updated at non-deterministic intervals from training neural networks; cross-validate the results with models from plurality of partitions other than the partition that this event was divided into; increase the score or suppress the novel behavior event based on cross-validation with models from other partitions; learn the novel behavior events using a second set of neural networks; filter out novel behavior events that are identical or similar to learned novel behaviors; identify net new novel behaviors and summarize novel behaviors into meaningful aggregation of novel behaviors using an iterative clustering approach.

2. The non-transitory computer readable medium of claim 1, wherein the machine readable instructions, when executed, further cause the at least one processor to:
receive network, user, device and application events from Log Management Systems, Applications, data lakes, and directly through devices through network connections or polling through cloud service providers.

3. The non-transitory computer readable medium of claim 1, wherein the machine readable instructions, when executed, further cause the at least one processor to:
create a plurality of partitions to partition network, user, device and application events; partition the received events to a set of partitions based on type of event, information stored in the event and a set of user or machine identifying information.

4. The non-transitory computer readable medium of claim 3, wherein the machine readable instructions, when executed, further cause the at least one processor to:
determine event load for each created partition using statistics, probability and rules; and in response to a determination that a partition is receiving high number of events, splitting the partition into multiple partitions; and in response to determination that a partition is receiving low number of events, merging the partition with an existing partition.

5. The non-transitory computer readable medium of claim 1, wherein the machine readable instructions, when executed, further cause the at least one processor to:
determine whether to update subset of the evaluation models with the latest state of corresponding trained models based on probabilistic and static conditions; and in response to determination that an evaluation model be updated, update subset of the evaluation models using the latest state of corresponding trained models.

6. The non-transitory computer readable medium of claim 5, wherein the machine readable instructions, when executed, further cause the at least one processor to:
determine whether to update subset of the evaluation models with the latest state of corresponding trained models based on a random probability value using normal probability distribution function and comparing the value against a static or dynamic threshold.

7. The non-transitory computer readable medium of claim 1, wherein the machine readable instructions, when executed, further cause the at least one processor to:
determine whether to update a subset of evaluation models with the latest state of corresponding training models based on the rate of identified novel behavior event; and in determination that the rate of identified novel behavior events of a model is high in absolute value or compared to other models, update subset of the evaluation models using the latest state of corresponding trained models.

8. The non-transitory computer readable medium of claim 1, wherein the machine readable instructions, when executed, further cause the at least one processor to:
determine whether to update a subset of evaluation models with the latest state of corresponding training models based on the history of the rate of identified novel behavior event; and in determination that the rate of identified novel behavior events of a model is increasing with respect to the past rate, update subset of the evaluation models using the latest state of corresponding trained models.

9. The non-transitory computer readable medium of claim 1, wherein the machine readable instructions, when executed, further cause the at least one processor to:
determine whether to update a subset of evaluation models with the latest state of corresponding training models based on the overall rate of novel behavior detections of all the models.

10. The non-transitory computer readable medium of claim 1, wherein the machine readable instructions, when executed, further cause the at least one processor to:
train a plurality of neural net models using novel behavior events; evaluate novel behavior events through these neural net models; suppress the anomalies that exhibit behavior similar to past anomalies; score the anomalies based on number and type of models detecting the anomalies.

11. The non-transitory computer readable medium of claim 1, wherein the machine readable instructions, when executed, further cause the at least one processor to:
cross-validate the novel behavior events through evaluation models from unique partitions; and in determination that the event is a novel event in other partitions, increase the novelty score of the novel event; and in determination that the event is not a novel event in one or more other partitions, classify the event as a normal behavior using a probability distribution and a static or dynamic threshold.

12. The non-transitory computer readable medium of claim 1, wherein the machine readable instructions, when executed, further cause the at least one processor to: adjust evaluation neural net model weights and thresholds based on feedback from the user based on quality and importance of detected anomalies by that model or by determination of the quality of the results by system itself.

13. An autonomous novel behavior detection apparatus comprising: at least one processor; a partitioning module that partitions network, user, application and device events into a dynamic number of partitions; a learning module that utilizes multiple types of neural networks to learn the behavior of received events; an evaluation module that evaluates received events against trained models, a novel behavior baseline module that learns identified novel behavior event behavior and filters out novel behaviors that are similar to past novel behaviors, novel behavior scoring module, that scores each novel behavior based on number and type of models that identified it along with calculated deviation from normal behavior, a past novel behaviors database to maintain all identified novel behaviors and deduplicate identified novel behaviors, a novel behavior clustering module to summarize the identified and scored novel behaviors; executed by the at least one processor, to identify novel behaviors in the network, user device and application events.

14. The non-transitory computer readable medium of claim 13, wherein the machine readable instructions, when executed, further cause the at least one processor to:
 identify a suitable dimension for aggregating novel events based on vector-distance proximity, identicality and similarity of values in the fields of novel behavior Events;
 repeating the process across multiple suitable dimensions, aggregating the values of the fields that have not been used for clustering, and providing the summarized novel behavior event that captures details of the network, user, device and application activity leading to the novel behavior.

15. The non-transitory computer readable medium of claim 13, wherein the machine readable instructions, when executed, further cause the at least one processor to:
 identify a suitable dimension for aggregating novel events based on vector-distance proximity after amplifying the values in subset of fields to increase distance between the values in the dimension corresponding to this field, giving more weight to one or more important dimensions.

16. The non-transitory computer readable medium of claim 13, wherein the machine readable instructions, when executed, causes a subset of identified training models to skip learning from random samples of events; where the rate and number of skipped events is dynamic.

* * * * *